United States Patent [19]

Nakamura

[11] Patent Number: 4,914,358
[45] Date of Patent: Apr. 3, 1990

[54] TOUCH PANEL INPUT CONTROL METHOD

[75] Inventor: Kenji Nakamura, Owariasahi, Japan

[73] Assignee: Hitachi, Ltd., Chiyoda, Japan

[21] Appl. No.: 195,096

[22] Filed: May 17, 1988

[30] Foreign Application Priority Data

May 21, 1987 [JP] Japan .................. 62-124416

[51] Int. Cl.⁴ .................. H01J 29/70; G09G 3/02
[52] U.S. Cl. .................. 315/364; 340/711; 341/24
[58] Field of Search .......... 315/364; 340/706, 711, 340/712, 365 E

[56] References Cited

U.S. PATENT DOCUMENTS 4,105,902 8/1978 Iwai et al. .................. 340/365 E
4,291,303 9/1981 Cutler et al. .................. 340/711

FOREIGN PATENT DOCUMENTS 60-124724 7/1985 Japan .
60-140420 7/1985 Japan .
60-262235 12/1985 Japan .

OTHER PUBLICATIONS

Terry Costlow, "Touch-Sensitive Systems Gain Ground for Data Entry", Electronic Design, Jan. 26, 1984; pp. 53-54.

Primary Examiner—Theodore M. Blum
Assistant Examiner—G. Issing
Attorney, Agent, or Firm—Kenyon & Kenyon

[57] ABSTRACT

An object placed on a transparent touch panel horizontally arranged on a CRT is detected as an undesired material if a touch state longer than a normal key-in input time is detected. Removal of the undesired material is requested by the CRT display or an audio unit so that repetitive malfunction is prevented. A second longer time may be set to call a service man.

2 Claims, 3 Drawing Sheets

TOUCH PANEL INPUT CONTROL METHOD

CROSS REFERENCE TO OTHER APPLICATIONS

The present invention relates to Patent Application Ser. No. 55,547 entitled "Touch Panel Input Device" and filed by H. Shimauchi on May 29, 1987, and Patent Application Ser. No. 120,880 entitled "Touch Panel Input Device" and filed by M. Oka on Nov. 16, 1987.

BACKGROUND OF THE INVENTION

The present invention relates to an input control system in a touch panel device which detects input information that is entered by touching a finger to a panel, and more particularly to an input control system suitable for application to a touch panel input device which has no restriction to a user.

In a prior art device shown in JP-A-60-140420, a touch position on a touch panel is fed back to an operator by voice. In a device shown in JP-A-60-124724, a display color in a screen of a key-entered area is changed. In those devices, validity of touch is checked after the touch to the touch panel.

SUMMARY OF THE INVENTION

It is an object of the present invention to provide an input control method in which an operator is informed, either before or after start of an entry, that an input to the panel is being made by an undesired material.

It is another object of the present invention to provide a method which permits normal entry even in the case of contact by an undesired material, by preventing the operator from being puzzled where an average input portion is taken from a plurality of touch positions.

The above objects of the present invention are achieved by an input control system in a device having a touch panel, in which contact which causes an invalid input in the touch panel is detected by continuous contact to the touch panel and it is informed to the operator.

In the present invention, based on the fact that entry by the operator by his/her contacting to the touch panel is instantaneous and momentary while contact by undesired material is continuous, a continuous contact time from the beginning of contact is measured. If the continuous contact time exceeds a predetermined value, the contact by the undesired material is detected so that invalidity is predicted and detected and the operator is notified to remove the undesired material.

As a result, invalid input is prevented and malfunction is prevented.

DESCRIPTION OF THE PREFERRED EMBODIMENTS

Figure 3:
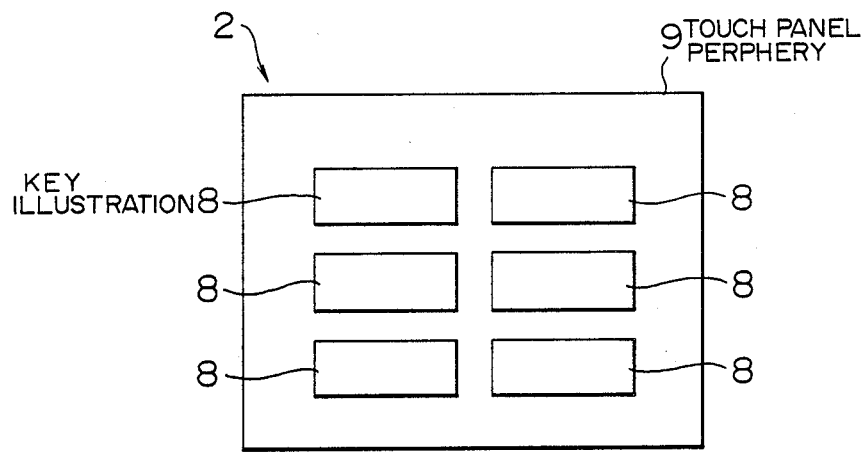
FIG. 3 shows a top view of a transparent touch panel.

In FIG. 3, numeral 8 denotes a key-shaped illustration to which an operator contacts his/her finger so that input data is determined based on a coordinate of the key 8. The operator may input using a corner of a card or a head of a pen, instead of using the finger. While an entire area, of a touch panel 2 is an input area from a viewpoint of the operator, only the illustrations 8 appear as the input area. Accordingly, the operator may sometimes put his/her belonging (for example, hand bag) on an area 9 other than the area of the illustrations 8. In this case, even if the operator contacts to a desired position, a different position is entered and the input is invalidated. The operator cannot understand the reason and repeats the same operation.

Figure 2:
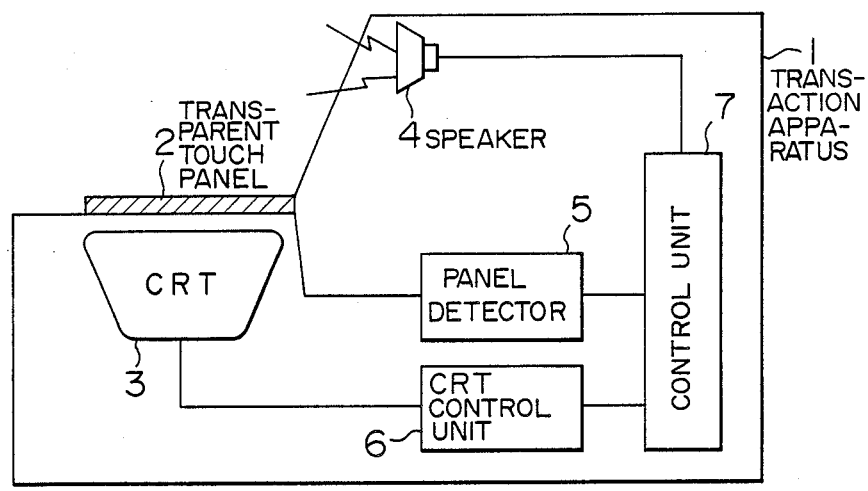
FIG. 2 shows a block diagram of the embodiment of the console apparatus.

FIG. 2 shows a block diagram of one embodiment of the console apparatus of the present invention. On a CRT 3 of the console apparatus 1 of the present embodiment, there are provided a transparent touch panel 2 and a panel detector 5 which detects a finger or the like contacting to the touch panel 2. An input request command to the operator is supplied to a CRT control unit 6 from a control unit 7 and displayed on the CRT 3.

The key-shaped illustrations 8 are arranged on the transparent touch panel 2. When the operator contacts his/her finger or like to the one of the illustrations 8, the input data is determined based on the coordinate of the illustration, as described above.

A normal operation of the present embodiment is described below.

The operator contacts his/her finger or the like to the touch panel 2 corresponding to the input display position of the CRT 3 in accordance with the display on the CRT 3. The panel detector 5 detects the input command and the control unit 7 receives an indication of the input selected. The control unit 7 determines whether the input is valid or invalid and drives a speaker. After the input process, the control unit 7 commands to the CRT control unit 6 a display for the next input, and displays it on the CRT 3. Then, the above operation is repeated.

Figure 1:
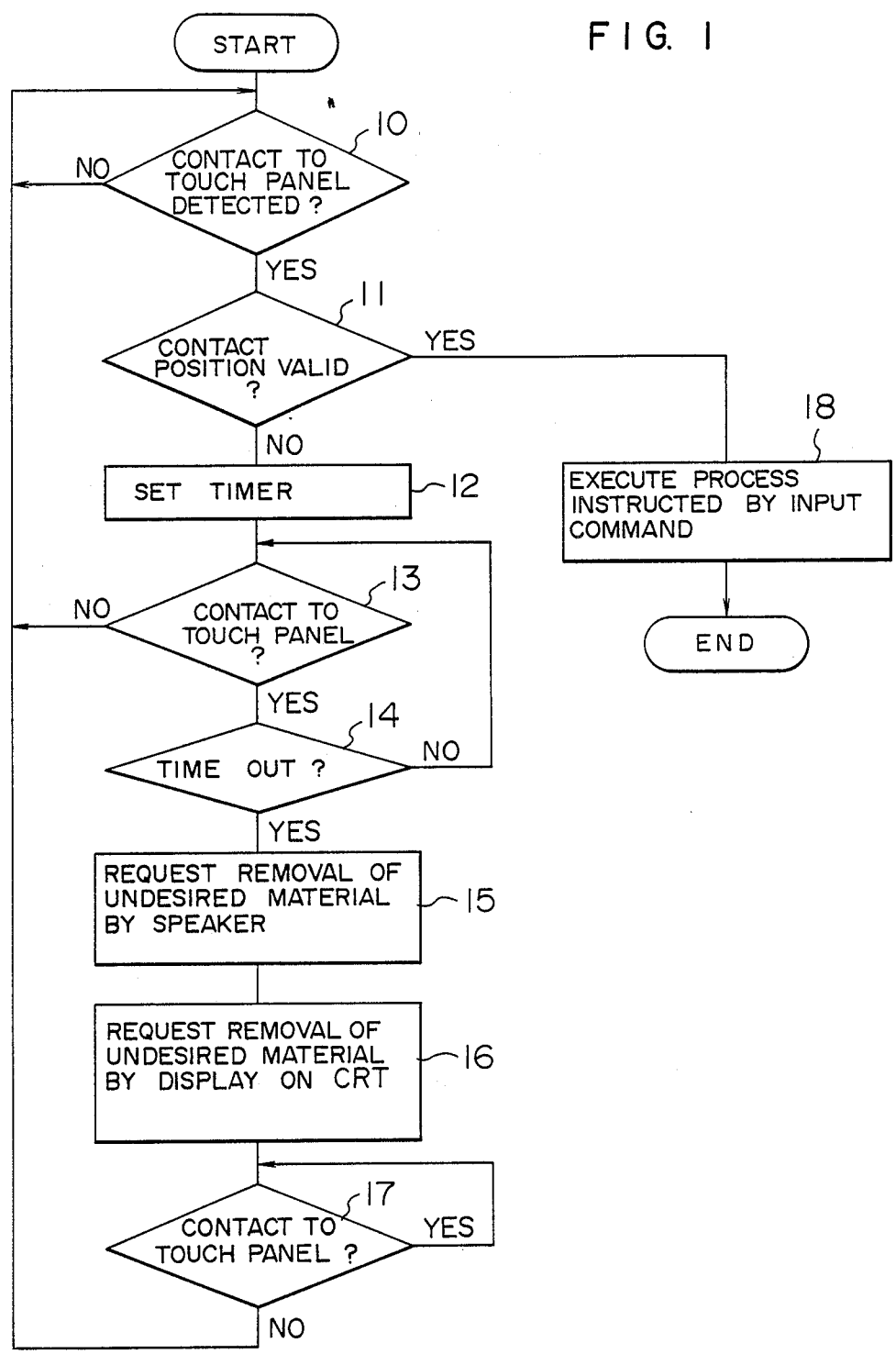
FIG. 1 shows a process flow chart of detection of invalid input and notification to an operator by a control unit according to an embodiment of a console apparatus of the present invention.

A characteristic operation of the present embodiment is explained with reference to FIG. 1, which shows a process flow chart of prediction and detection of invalid input and notification thereof to the operator by the control unit 7.

When the control unit 7 detects the contact in a decision step (step 10) to monitor the contact by the operator to the touch panel 2, it determines whether the input corresponds to the position of the illustration 8 of the key displayed on the screen (step 11). If the decision is valid, the process is executed (step 18), and if it is invalid, a timer is set (step 12), and the continuous contact time is measured in steps 13 and 14.

If a timeover, a time exceeding a certain threshold, is detected (step 14), the contact is identified as a contact by an undesired material and the operator is notified by the speaker 4 and the CRT 3 to remove the undesired material (steps 15 and 16). Then, if non-contact of undesired material is detected (step 17), the process returns to the initial state (step 10).

In accordance with the present embodiment, the notification to remove the undesired mateial is issued before the device has been placed into a condition which confuses the operator.

In the present embodiment, the control unit 7 measures the continued time of the output from the panel detector 5, and if a predetermined time has elapsed, the control unit 7 determines it as the contact by the undesired material and notifies the user by the speaker 4 and CRT 3 to remove the undesired material. The length of the predetermined time may be set arbitrarily.

Figure 4:
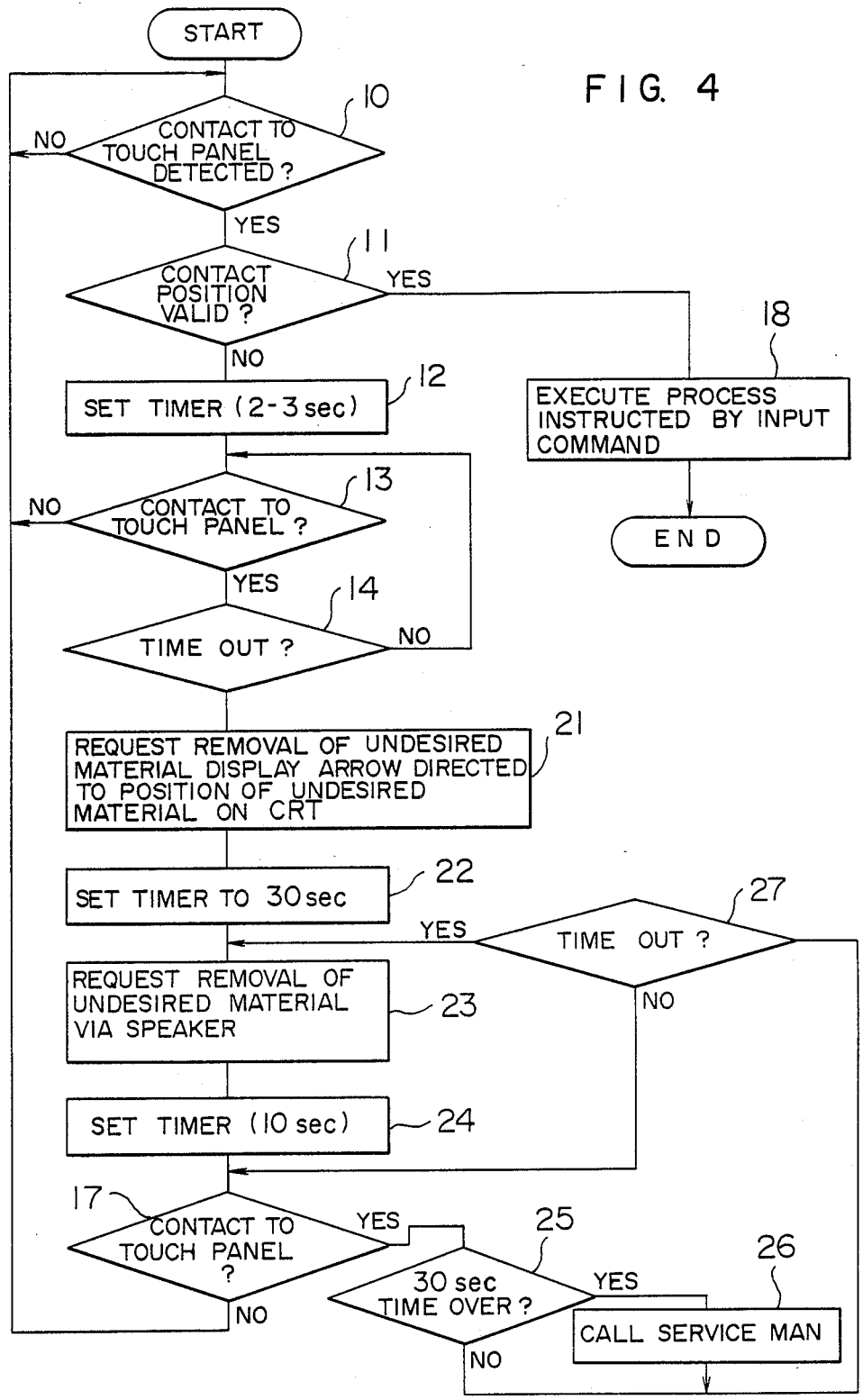
FIG. 4 shows a process flow chart of detection of invalid input and notification to the operator by the control unit.

FIG. 4 shows another embodiment. The like blocks to those shown in the flow chart of FIG. 1 are designated by the like numerals. In steps 10-14, after the undesired material on the touch panel is detected, a message to request the removal of the undesired material is displayed and preferably the position of the undesired material is recognized by X-Y coordinates and an arrow to indicate the position is displayed (step 21). In the next step 22, a time necessary for the operator to detect the undesired material on the touch panel, for example, 30 seconds, is set to a timer (not shown). In the next step 23, a message to request the removal of the undesired material is sent to the speaker 4 (step 23). In many cases, the undesired material is removed in several seconds by the display and/or voice notice (step 24) so that no undesired material is detected in a step 17 and the process returns to the initial step 10 of FIG. 4. If the presence of the undesired material is still detected, the display given in the step 21 is kept on the screen and steps 23 and 24 are repeatedly executed every 10 seconds using the decision step 27. If the repetitive process continues for the predetermined time (step 25), a service man who maintains the touch panel input device is called (step 26). In this manner, the undesired material is removed. Then, touch entry is carried out to normal input areas in steps 10 and 11, and then a normal process of a step 18 is executed.

I claim:

1. A method for controlling input to a touch panel of a touch panel input device that has a display for displaying key illustrations to request input operation on a screen, a transparent touch panel arranged substantially horizontally on said display for inputting the input operation as touch inputs into key-shaped illustration areas on the touch panel, and a control unit connected to said display and said touch panel for controlling said display and said touch panel, comprising the steps of:

(a) detecting if touch input to said touch panel including said key-shaped illustrating areas and other areas of the touch panel lasts for a first predetermined time longer than a normal key input operation time;

(b) when a touch input lasting for a period longer than said first predetermined time is detected on said other areas of said touch panel, preventing from responding to and requesting removal of an undesired material from said touch panel; and (c) detecting continuous presence of the undesired material on said touch panel for a second predetermined time after requesting removal of the undesired material, said second predetermined time being longer than said first predetermined time; and (d) when said continuous presence of the undesired material is detected for a period longer than said second predetermined time, producing an output to call a service man for the touch panel input device.

2. A method for controlling input to a touch panel according to claim 1 further including a step of displaying an arrow directed to the position of the undesired material on said touch panel.

* * * * *